United States Patent
Sorge et al.

(10) Patent No.: US 7,454,471 B2
(45) Date of Patent: Nov. 18, 2008

(54) SENDING A RANGE

(75) Inventors: Terri Sorge, Kirkland, WA (US); Matthew Gauthier, Redmond, WA (US); Carol Liu, Sammamish, WA (US); Margaret Hudson, North Bend, WA (US); Robert McCaughey, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 11/181,683

(22) Filed: Jul. 13, 2005

(65) Prior Publication Data

US 2006/0020673 A1     Jan. 26, 2006

Related U.S. Application Data

(63) Continuation of application No. 09/595,741, filed on Jun. 16, 2000, now abandoned.

(51) Int. Cl.
    G06F 15/16      (2006.01)
(52) U.S. Cl. ........................................ 709/206; 715/752
(58) Field of Classification Search ................ 709/206; 715/503, 752, 760
See application file for complete search history.

(56) References Cited

U.S. PATENT DOCUMENTS

| | | | | |
|---|---|---|---|---|
| 5,818,447 A * | 10/1998 | Wolf et al. | ................... | 715/752 |
| 5,838,906 A * | 11/1998 | Doyle et al. | ............. | 715/501.1 |
| 5,870,746 A * | 2/1999 | Knutson et al. | ............. | 707/101 |
| 6,907,452 B1 * | 6/2005 | Malik | ......................... | 709/206 |
| 7,076,730 B1 * | 7/2006 | Baker | ......................... | 715/210 |
| 7,089,286 B1 * | 8/2006 | Malik | ......................... | 709/206 |
| 7,155,482 B2 * | 12/2006 | Shinohara et al. | ........... | 709/206 |
| 7,281,245 B2 * | 10/2007 | Reynar et al. | ................ | 717/173 |
| 7,293,269 B2 * | 11/2007 | Belt et al. | .................... | 717/178 |

* cited by examiner

OTHER PUBLICATIONS

Chappell, David, Book entitled "Understanding ActiveX and OLE, A Guide for Developers & Managers", Microsoft Press, 1996.

*Primary Examiner*—Douglas B Blair
(74) *Attorney, Agent, or Firm*—Merchant & Gould PC (57) ABSTRACT

The invention is a software module configured for sending a pre-selected portion of an electronic spreadsheet document to a mail client or recipient via e-mail. The module includes a publish engine for receiving a sender's pre-selected portion of a spreadsheet document from an application program. The publish engine determines content in the pre-selected portion of the document, and in response to the content of the pre-selected portion, the publish engine changes a user interface to correspond with the content. When the publish engine receives a command through the user interface to send the pre-selected portion to a mail client via electronic mail, the publish engine codes the pre-selected portion for transmission via electronic mail. The publish engine launches an electronic mail application program, and inserts the coded pre-selected portion into an e-mail message. If the publish engine detects a user command through the user interface to apply an interactive control to the pre-selected portion, the publish engine codes an interactive control for the pre-selected portion. The publish engine inserts the coded interactive control into the e-mail message with the coded pre-selected portion so that the mail client or recipient can apply the interactive control to the pre-selected portion. Then, the publish engine sends the coded pre-selected portion and the coded interactive control to the mail client or recipient via electronic mail. The mail client or recipient can view and manipulate the pre-selected portion with electronic spreadsheet functionality similar to that available to the sender.

16 Claims, 5 Drawing Sheets

SENDING A RANGE

TECHNICAL FIELD

This invention relates generally to the field of electronic spreadsheets and, more particularly, to sending pre-selected portions of a spreadsheet document to a mail client via electronic mail protocols.

BACKGROUND OF THE INVENTION

Electronic spreadsheets and other computer application programs permit a user to manipulate and work with data, numbers, and mathematical formulas within a spreadsheet document. Typically, a user can create various tables and charts within a spreadsheet document to accomplish a variety of tasks such as accounting, engineering, or scientific functions. Functionality within many electronic spreadsheets and other computer application programs permits the user to view data or numbers in different configurations and formats. Electronic spreadsheets and other computer application programs permit the user to save data in the form of hypertext markup language (HTML) documents or files.

In some cases, a user may want to share portions of a particular spreadsheet document with another user. HTML has become the internationally accepted format for sharing data over the Internet, or "on-line". Typical HTML documents or files include images, text, and data. An "on-line" information system typically includes a server computer system that makes information available so that one or more client computer systems can access the information. The server and the client computer systems are usually connected in either a local area network or a wide area private Intranet system, or via the public Internet.

One method of sharing an HTML document or file is through the use of a Web browser program. Web browsers provide a user with the capability of finding, retrieving, and displaying documents via the Internet. A web browser is generally not intended for data manipulation or word processing of the information contained within an HTML document, but can display documents or data generated by electronic spreadsheet or word processing application programs, once converted into an appropriate HTML compatible format.

Electronic mail, commonly known as e-mail, is another convenient method for sharing information "on-line". Typically, e-mail application programs permit a user to send HTML documents via e-mail. In some cases, a sender may want to send only a pre-selected portion of a spreadsheet document to a recipient. One method of sending a pre-selected portion of a spreadsheet document is by attaching a new document containing the spreadsheet portions to an e-mail message. The sender then sends the e-mail message with the attached document to the recipient. The recipient receives the e-mail message and retrieves the attached document. The attached document can be viewed with a compatible application program that can read the document containing the pre-selected spreadsheet portions.

Another method of sending a pre-selected portion of a spreadsheet document via e-mail is by inserting the pre-selected spreadsheet portions into the body of an e-mail message. The e-mail message containing the pre-selected spreadsheet portions can then be sent to a recipient. When the recipient receives the e-mail message, the recipient can view the pre-selected spreadsheet portions with an electronic mail client or other compatible mail application program.

Conventional data editing functions such as "cut", "copy", and "paste" permit a sender to define a pre-selected portion of a spreadsheet document. The sender highlights a selected portion of the spreadsheet document to be sent to a recipient. The sender can then select the "cut" command to move the highlighted portion into computer memory such as RAM. Alternatively, the sender can select the "copy" command to copy the highlighted portion into computer memory. In either case, the computer memory stores the pre-selected portion of the spreadsheet document for recall by the sender. The sender can then select the "paste" command to move the pre-selected portion of the spreadsheet document into a new document to be attached to an e-mail message. Alternatively, the sender can select the "paste" command to move the pre-selected portion of the spreadsheet document directly into the body of an e-mail message.

Using conventional "cut", "copy", and "paste" functions can be slow and cumbersome. Typically, a sender opens an electronic mail application program running in conjunction with the electronic spreadsheet or other computer application program. The sender then switches between the electronic mail application program and the electronic spreadsheet or other computer application program to create an e-mail message containing the pre-selected portion of the spreadsheet document to be sent to another user. Numerous input commands, such as keystrokes or mouse clicks, by the sender adds significant time to the sender's operation of sending a pre-selected portion of a spreadsheet document to a recipient.

After a recipient views the received pre-selected portions of a spreadsheet document via e-mail, the recipient may want to manipulate the data, numbers, and mathematical formulas. However, if the recipient opens an attached document containing a pre-selected portion of a spreadsheet document, the recipient must also open or run a compatible application program in order to view the data contained in the pre-selected portion of the spreadsheet document. If the recipient does not use a compatible application program, the data will be unreadable. In some cases, the recipient may be able to view the data, but the data cannot be manipulated by the recipient within its original spreadsheet document formatting.

If the recipient opens a received e-mail message having the pre-selected portion in the body of the spreadsheet document, the recipient can use the mail client to view the data contained within the pre-selected portion of the spreadsheet document. However, the recipient will not be able to manipulate the data within its original spreadsheet document formatting, and may not be able to manipulate the data at all. If the recipient does not have an electronic spreadsheet application program or other compatible computer application program, the recipient will be limited to viewing the data in the format in which the data was received in.

For example, a characteristic of spreadsheet data tables and charts incorporated into HTML documents using prior art methods is that once the data tables or charts are imported into an HTML document, they lose virtually all of the functionality they had in the electronic spreadsheet application program. Furthermore, a data table published into an HTML document cannot be reintroduced into its parent application with its original functionality intact, because critical formatting information unique to the parent spreadsheet application, such as any formulas included in the data table, are not maintained. Thus, formulas and other spreadsheet application unique parameters are lost in the publication process. Manipulation of the data from the HTML document within the parent application is thus not available.

Thus, there is a need in the art for an improved method and system for sending a pre-selected portion of a document via e-mail.

There is a further need for a method and system for sending a pre-selected portion of a document via e-mail that can be viewed and manipulated within its original document formatting without having to open another application program.

SUMMARY OF THE INVENTION

The present invention meets the needs described above in an improved method and system for sending a pre-selected portion of a document to a mail client via electronic mail (e-mail). Furthermore, the present invention meets the needs described above in a method and system for sending a pre-selected portion of a document to a mail client via e-mail that can be viewed and manipulated within its original document formatting without having to open another application program.

A preferred embodiment of the present invention is included in the EXCEL 2000 electronic spreadsheet program, manufactured, distributed, and sold by Microsoft Corporation of Redmond, Wash., as part of its OFFICE 2000 product line. A sender working with a document associated with an electronic spreadsheet application program typically tracks and manipulates information or data within the electronic spreadsheet document. If the sender wants to update a recipient with monthly information reports, the sender can send the recipient portions of the electronic spreadsheet document via e-mail. Using an input device such as a mouse or keyboard, the sender can input a highlighted or defined data range within the electronic spreadsheet document. After a data range has been highlighted or defined by the sender, a corresponding command appears in a user interface within the electronic spreadsheet application program. The command in the user interface corresponds with the selected data range, and permits the sender to select the command to send the data range to the recipient such as a mail client via e-mail. By selecting the command in the user interface, the sender inserts the pre-selected data range into a body of an e-mail message associated with an electronic mail application program. The electronic mail application program may permit the sender to insert information into a header of the e-mail message. Upon further user input, the e-mail message can be sent to the recipient.

If the sender wants to add interactivity to the pre-selected data range, the sender selects a corresponding command in the user interface before sending the e-mail message. Coded interactive controls are included with the e-mail message to enable the recipient to manipulate the pre-selected portion with spreadsheet functionality similar to the functionality available to the sender.

Generally described, the invention is a publish module for sending a pre-selected portion of a document to a mail client or recipient via e-mail. The publish module includes a publish engine for receiving a pre-selected portion of a document from an application program. The publish engine determines content in the pre-selected portion of the document, and in response to the content of the pre-selected portion, the publish engine changes a user interface to correspond with the content. When the publish engine receives a command through the user interface to send the pre-selected portion of the document to a mail client or recipient via electronic mail, the publish engine codes the pre-selected portion of the document for transmission via electronic mail. The publish engine launches an electronic mail application program, and inserts the coded pre-selected portion of the document into an e-mail message. Then, the publish engine sends the coded pre-selected portion of the document to the mail client or recipient via electronic mail.

According to an aspect of the invention, if the publish engine detects a command through the user interface to apply an interactive control to the pre-selected portion of the document, the publish engine codes an interactive control for the pre-selected portion. The publish engine inserts the coded interactive control into the e-mail message with the coded pre-selected portion of the document so that the mail client or recipient can apply the interactive control to the pre-selected portion.

According to another aspect of the invention, the publish engine codes the pre-selected portion of the document into HTML, and further codes interactive controls for the pre-selected portion of the document in ActiveX.

That the invention improves over the drawbacks of prior electronic spreadsheet and other computer application programs, and accomplishes the advantages described above will become apparent from the following detailed description of the exemplary embodiments and the appended drawings and claims.

DETAILED DESCRIPTION OF EXEMPLARY EMBODIMENTS

The invention may be implemented as a publish software module that implements a publish routine for a pre-selected portion of a document. As an object-oriented program, the publish module exposes a standard interface that client programs may access to communicate with the publish module. The object-oriented architecture permits a number of different client programs, such as an electronic spreadsheet program, a word-processing program, and other application programs, to use the publish module. For example, the publish module can be used with an application program such as Microsoft EXCEL 2000. Before explaining how the invention is implemented, it will be helpful to define several terms.

The term "sender" as used herein and in the claims that follow means a user that sends a pre-selected portion of document. The term "recipient" as used herein and in the claims that follow means a user that receives a pre-selected portion of a document from the sender. The term "user" refers to either a sender or a recipient.

Turning now to the present invention, the interface exposed by the publish module allows the module to receive input such as a pre-selected portion of the document associated with an application program. The publish module receives the pre-selected portion of the document as input, codes the pre-selected portion of the document, and sends the coded pre-selected portion of the document via electronic mail to a mail client.

The publish module may be configured as a publish engine. The publish engine receives the pre-selected portion of a document from an application program, and processes the pre-selected portion of the document to determine the content of the pre-selected portion. Based upon the content of the pre-selected portion, the publish engine provides a user interface corresponding with the content of the pre-selected portion of the document. In response to a user's command through the user interface, the publish engine interacts with an application program and processes the pre-selected portion of the document into coded HTML. The publish engine launches an electronic mail application program, and inserts the coded pre-selected portion of the document into an e-mail message. The publish engine sends the e-mail message containing the coded pre-selected portion of the document to a mail client, and calls to the application program as necessary. For example, the publish engine can provide feedback to the application program to verify that an e-mail has been sent.

Exemplary Operating Environment

Figure 1:
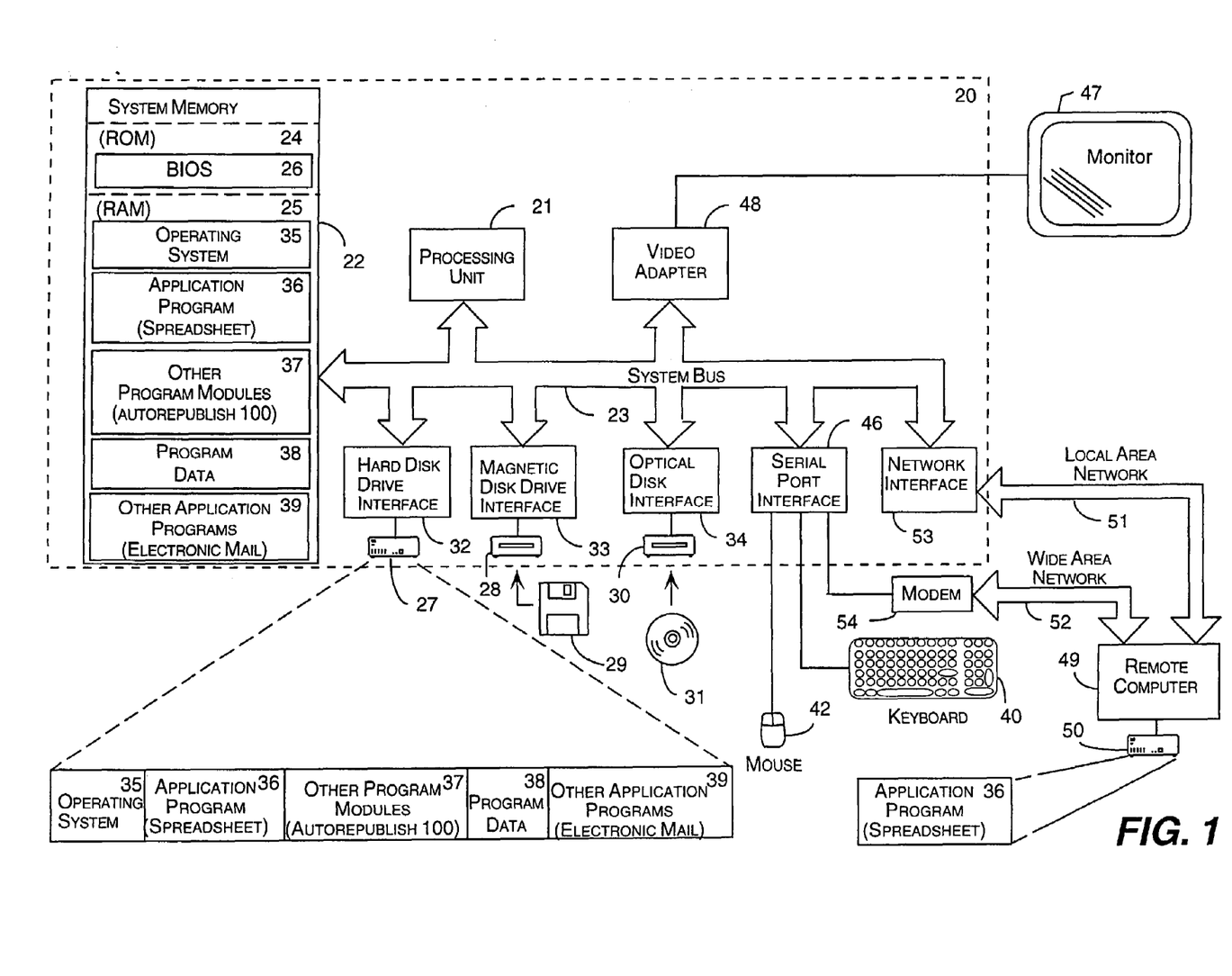
FIG. 1 is a functional block diagram of a personal computer system that provides the operating environment for the exemplary embodiments of the invention.

FIG. 1 and the following discussion are intended to provide a brief, general description of a suitable computing environment in which the invention may be implemented. While the invention will be described in the general context of an electronic spreadsheet or other application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, program data 38, and other application programs 39. In particular, one of the other program modules is a publish module 100 that includes certain embodiments of the invention, which are described below with reference to FIGS. 2-4. Generally, a publish module 100 comprises computer-executable instructions for receiving a user's pre-selected portion of a document, and receiving a command to send the pre-selected portion of the document to a mail client via electronic mail. In response to receiving the command to send the pre-selected portion of the document, the publish module 100 further comprises computer-executable instructions for coding the pre-selected portion of the document for transmission via electronic mail, and sending the coded pre-selected portion of the document to the mail client via electronic mail. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into the EXCEL 2000 electronic spreadsheet application program manufactured and sold by Microsoft Corporation of Redmond, Wash., for use with personal computer systems such as the illustrative personal computer 20. The invention may be deployed within, or in connection with, the OFFICE 2000 suite of application programs including, among others, an EXCEL 2000 electronic spreadsheet application program. It will be appreciated that the principles of the invention are not limited to electronic spreadsheets or other software programs, but could equivalently be applied to any computer-implemented system that involves the use of predefined document layouts.

For example, the invention may be implemented within a system that allows the user to extract objects from a document, such as a system that allows the user to drag headlines, footers, or the like from a desktop publishing document and to drop these objects into a file in another program module. In this case, the object property propagation rules defined by the desktop publishing program may be automatically applied to the extracted objects after they are dropped into the file in the other program module. In addition, it is contemplated that the invention may be deployed in connection with future versions of electronic spreadsheet application programs, slide-show presentation application programs, and so forth, manufactured by Microsoft Corporation and other software manufacturers. It will be further appreciated that the invention could equivalently be implemented on host computers other than personal computers, and could equivalently be transmitted to the host computer by means other than a CD-ROM, for example, by way of the network connection interface 53.

Notwithstanding the broad applicability of the principles of the invention described above, it should be understood that the configuration of the exemplary embodiment as an application program for widely-used personal computers provides significant advantages. In particular, the publish module 100 described in this specification is specifically designed to exhibit acceptable memory-use and performance characteristics when implemented on the conventional personal computer system 20. In so configuring the publish module 100, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

Figure 2:
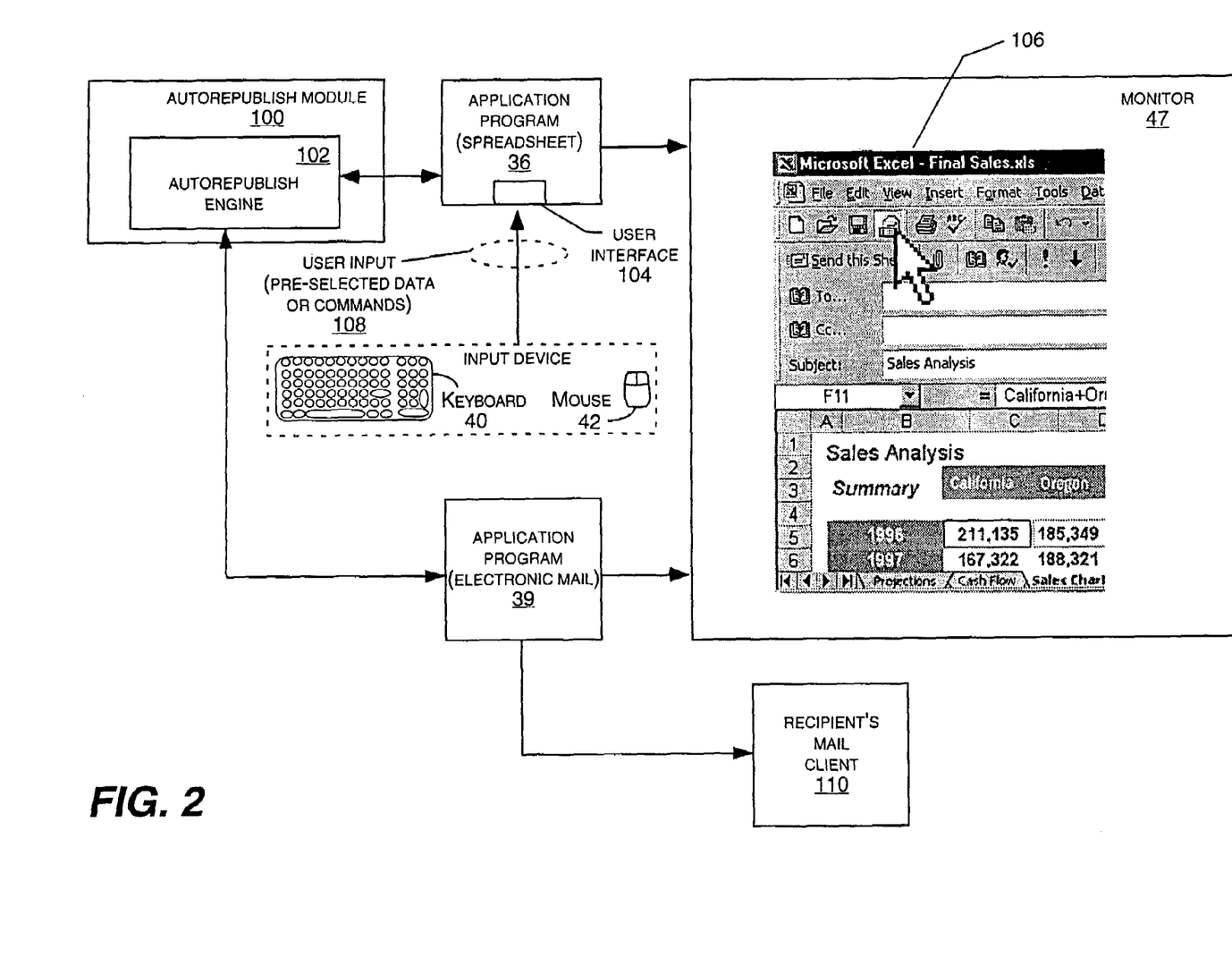
FIG. 2 shows a functional block diagram that illustrates a publish program module for sending a pre-selected portion of a document via e-mail in accordance with an exemplary embodiment of the present invention.

FIG. 2 shows a functional block diagram that illustrates a publish program module 100 for sending a pre-selected portion of a document to a mail client via electronic mail (e-mail). The publish program module 100 includes a publish engine 102. The publish engine 102 interacts with an application program 36 such as a spreadsheet. A user interface 104 permits a sender to select from a list of commands within the application program 36, and to manipulate a viewable document 106 on a monitor 47 through the user interface 104. The sender interacts with the user interface 104 through an input device such as a keyboard 40 or a mouse 42 to generate user input 108. For example, user input 108 can include a command for pre-selecting a portion of a document 106, such as a range of numbers within a spreadsheet document.

When the sender pre-selects a portion of a document 106, such as a range of numbers, the publish engine 102 executes a routine to provide the sender with a user interface option, via the user interface 104, to send the pre-selected data via e-mail. An exemplary routine to provide the sender with the option to send the pre-selected portion of the document 106 via e-mail is shown in and described with reference to FIG. 3. After the publish engine 102 receives the sender's pre-selected portion of the document 106 from the application program 36, the publish engine 102 executes a subroutine to determine the content of the pre-selected portion of the document 106. An exemplary subroutine to determine the content of the pre-selected portion of the document 106 is shown in and described with reference to FIG. 4. After the publish engine 102 determines the content of the pre-selected portion of the document 106, the publish engine 102 may be configured to change a particular command in the user interface 104 to correspond with the content of the pre-selected portion of the document 106. For example, in response to determining that the pre-selected portion of the document 106 is within a table in a spreadsheet document, the publish engine 102 can change the user interface 104 to offer the sender a command to "Send the table". In another instance, in response determining that pre-selected portion of the document 106 is within a chart in a spreadsheet document, the publish engine 102 can change the user interface 104 to present a selectable command to "Send the chart".

When the sender decides to send pre-selected portion of the document 106 to a mail client 110, the sender selects a corresponding "send" command in the user interface 104. The publish engine 102 receives the "send" command, and continues the routine to send the pre-selected portion of the document 106 to a mail client 110 via e-mail. The publish engine 102 codes the pre-selected portion of the document 106 into a file format compatible for transmission via e-mail. For example, the publish engine 102 can code a pre-selected data range in a spreadsheet document into an HTML document or file using conventional data parsing and coding methods. The HTML document or file can be stored locally, or at a remote location.

Furthermore, interactive controls can also be coded with the pre-selected portion of the document 106 in response to a command to provide such functionality. For example, the publish engine 102 can provide a user interface command, via a user interface 104, to "Add interactivity". In response to a selection of the "Add interactivity" command, the publish engine 102 codes interactive controls for the pre-selected portion of the document 106. For example, conventional methods are used for coding interactive commands and inserting the commands into the document 106.

The publish engine 102 can interact with and cause the launch of an electronic mail application program 39, such as Microsoft Outlook. The electronic mail application program 39 includes functionality for initiating an e-mail message with a body and a header. The publish engine 102 interacts with the electronic mail application program 39 in order to insert the coded pre-selected document 106 and any selected interactive controls into the body of the e-mail message. The publish engine 102 may be configured to provide the sender with the opportunity to generate user input 108 such as information for a header of the e-mail message. For example, user input 108 such as information for an e-mail header can include typical e-mail headings such as "To", "cc", "bcc", and "subject". When the sender inputs an address of a mail recipient into the header, the publish engine 102 can interact with the electronic mail application program 39 to cause an e-mail message to be sent to the intended recipient.

Figure 3:
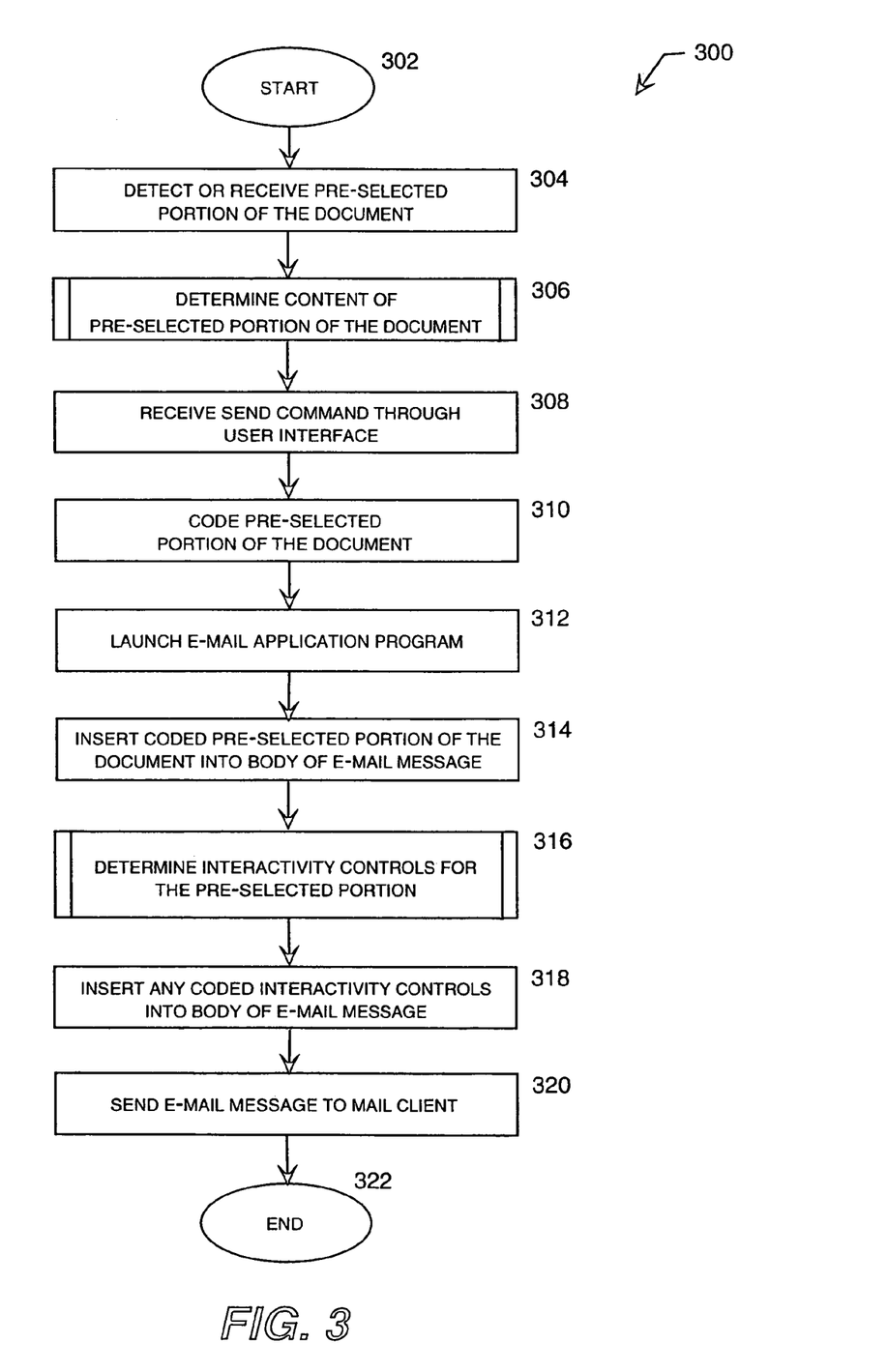
FIG. 3 a logic flow diagram illustrating an exemplary method for sending a pre-selected portion of a document via e-mail.

The recipient receives the e-mail message using a compatible electronic mail client 110, the mail client 110 can be used to open the e-mail message to permit the recipient to view the pre-selected portion of the document 106. If the sender selected interactive controls for the pre-selected portion of the document 106, the mail client 110 or recipient may have the ability to manipulate the pre-selected portion of the document 106 according to interactive control functionality coded within the e-mail message. For example, a mail client with ActiveX capability could provide a recipient with the ability to manipulate the pre-selected portion of the document 106 according to interactive control functionality coded within the e-mail message FIG. 3 shows a logic flow diagram illustrating a routine 300 for sending a pre-selected portion of a document 106 to a mail client 110 or recipient via e-mail. In a conventional electronic mail environment, an e-mail message is sent by a sender to a mailbox on a mail server. A recipient retrieves the e-mail message via a mail client. In step 302, the routine 300 begins. Step 302 is followed by step 304, in which the publish engine 102 receives a sender's pre-selected portion of a document 106 from an application program 36. For example, the publish engine 102 can receive a pre-selected data range in a spreadsheet document from a spreadsheet application program. When a sender operates an input device such as a keyboard 40 or a mouse 42, the sender generates user input 108 such as a command or command for pre-selecting data in a document 106. The publish engine 102 receives or detects the pre-selected data in the document 106 from the application program 36.

Step 304 is followed by subroutine 306, in which the publish engine 102 determines the content of the pre-selected portion of the document 106. Typically, the publish engine 102 processes the pre-selected portion of the document 106 to determine the content of the pre-selected portion. In response to specific content of the pre-selected portion of the document 106, the publish engine 102 may change one or more commands in the user interface 104 so that the commands correspond with the content of the pre-selected portion of the document 106. For example, in response to determining that a pre-selected portion of a document 106, such as a pre-selected data range, is within a table in a spreadsheet document, the publish engine 102 may change the user interface 104 to offer the user a command to "Send the table". Other changes to the user interface 104 and commands that may be presented herein are described in further detail with reference to subroutine 306 in FIG. 4.

Subroutine 306 is followed by step 308, in which the publish engine 102 receives a "send" command via the user interface 104. Typically, the "send" command is a user input 108 generated by an input device such as a keyboard 40 or a mouse 42 through the user interface 104. The user input 108 is received by the application program 36, and the user input 108 is then sent to the publish engine 102. Other user inputs can be processed by the user interface to generate a similar type of command for the application program 36.

Step 308 is followed by step 310, in which the publish engine 102 codes the pre-selected portion of the document 106. Typically, the publish engine 102 converts the pre-selected portion of the document 106 into a format compatible for transmission by e-mail to a mail server. For example, the publish engine 102 can convert a user's pre-selected data range in a spreadsheet document to HTML code for insertion into the body of an e-mail message. Conventional methods are used to code portions of a spreadsheet document into HTML or another compatible file format for transmission via e-mail. Methods of coding portions of a spreadsheet are disclosed in U.S. application Ser. No. 09/333,816, titled "Publishing/Republishing Data Tables in HTML Documents" filed on Jun. 15, 1999, which is commonly owned by and assigned to Microsoft Corporation, are hereby incorporated by reference. Furthermore, methods of storing spreadsheets in HTML are disclosed in U.S. application Ser. No. 09/333,815, titled "Storage of Application Specific Data in HTML" filed on Jun. 15, 1999, which is commonly owned by and assigned to Microsoft Corporation, are hereby incorporated by reference.

Step 310 is followed by step 312, in which the publish engine 102 causes the launch of an electronic mail application program 39. Typically, the publish engine 102 instructs the computer 20 to execute an electronic mail application program 39 to run in conjunction with the publish module 37. The electronic mail application program 39 can be an e-mail program such as Microsoft Outlook. A web browser (not shown) may also operate in conjunction with the electronic mail program 39, such that the publish engine 102 may communicate with and instruct the web browser to launch the electronic mail program 39. For example, a web browser, such as Microsoft Internet Explorer 4.0 manufactured and sold by Microsoft Corporation of Redmond, Wash., can operate in conjunction with Microsoft Outlook. Other web browsers such as Netscape Navigator from Netscape Communications Corp. of Mountain View, Calif., can also be used in conjunction with an electronic mail application program 39.

Step 312 is followed by step 314, in which the publish engine 102 inserts the coded pre-selected portion of the document 106 into an e-mail message. Typically, the publish engine 102 instructs the electronic mail application program 39 to create a new e-mail message. The publish engine 102 then inserts the coded pre-selected portion of the document 106 into the body of the e-mail message for transmission via e-mail to a recipient. The publish engine 102 also prompts the sender to generate additional user input 108 such as header information for the e-mail message. For example, header information can include typical e-mail headers such as "To", "cc", "bcc", or "subject". In most cases, the electronic mail application program 39 will default to the sender's e-mail address for the "From" header, and automatically fill in this header information to save time. When the sender completes the e-mail header using user input 108 from an input device, such as a keyboard 40 or mouse 42, and the user input 108 is sent to the electronic mail application program 39. For example, the sender can be prompted to type information on a keyboard 40 into conventional e-mail header block fields such as "To", "cc", "bcc", "subject". When the sender has completed at least the "To" field, the sender can generate a user input 108 to the electronic mail program 39 to indicate that the e-mail message is ready to be sent to a mail client 110 or recipient. Alternatively, the publish engine 102 can prompt the sender for additional user input 108 to complete an e-mail header in step 318.

Step 314 is followed by subroutine 316, in which the publish engine 102 determines interactive controls for the pre-selected portion of the document 106. Typically, if a sender selects a command on the user interface 104 to add interactivity for the pre-selected portion of the document 106, then the publish engine 102 codes interactive controls with the pre-selected portion of the document 106. If the sender does not select a command on the user interface 104 to add interactivity for the pre-selected portion of the document 106, then the publish engine 102 does not code interactive controls with the pre-selected portion of the document 106. Even though interactive controls may not be provided for the pre-selected portion of the document 106, a mail client 110 or recipient can still view the sender's pre-selected portion of the document 106. Subroutine 316 is shown and described in further detail in FIG. 5.

Subroutine 316 is followed by step 318, in which the publish engine 102 inserts any coded interactive controls for the pre-selected portion of the document 106 into the body of an e-mail message. As explained with reference to subroutine 316 in FIG. 5, coded interactive controls provide a mail client 110 or recipient with the ability to interactively view the received sender's pre-selected portion of the document 106. If the sender does send interactive controls to a mail client 110 or recipient using an electronic mail application program that does not support interactive control functionality, then the mail client 110 or recipient may not be able to manipulate the pre-selected portion of the document 106 received.

Step 318 is followed by step 320, in which the publish engine 102 sends the e-mail message containing the coded pre-selected portion of the document and any code for selected interactive controls for the pre-selected portion of the document 106 to a mail client 110 or recipient.

Step 318 is followed by step 320, in which the routine 300 ends.

Figure 4:
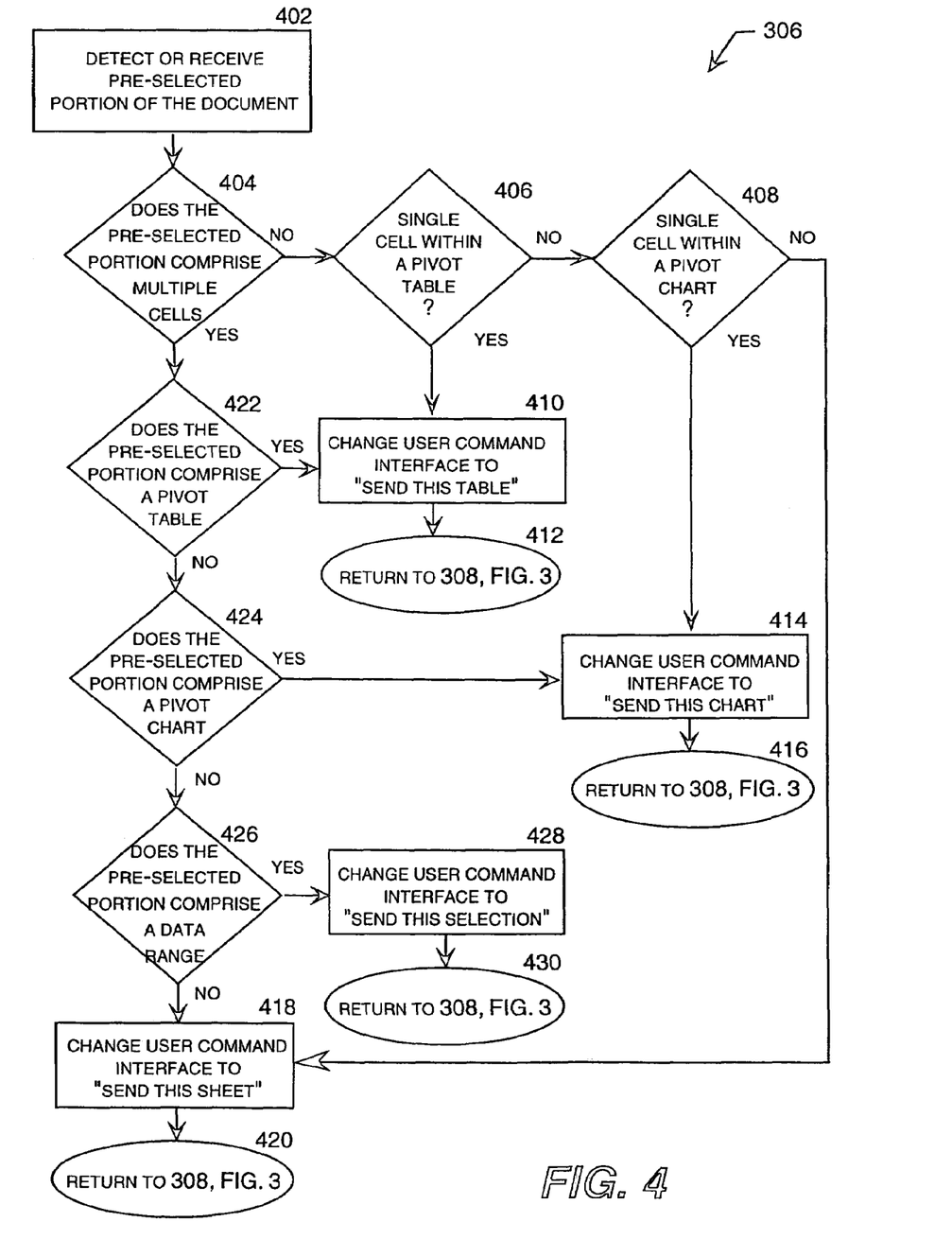
FIG. 4 is a logic flow diagram illustrating an exemplary method for determining the user pre-selected portion of a document to be sent via e-mail.

FIG. 4 illustrates a logic flow diagram illustrating an exemplary subroutine 306 for determining the content of a pre-selected portion of a document 106. In step 402, the publish engine 102 receives or detects the pre-selected portion of a document 106. A sender pre-selects the portion of a document 106 within an application program 36 by generating a user input 108 with an input device such as a keyboard 40 or a mouse 42. For example, a user can pre-select a portion of a document 106 such as a data range in a spreadsheet document by highlighting the data range with a mouse 42. The data range can be a single cell, a range of cells outside of a chart or table, a range of cells within a chart or table, a chart such as a pivot chart, a table such as a pivot table, a graphic, or other similar objects. When the sender pre-selects a portion of a document 106, the publish engine 102 detects or receives the sender's pre-selected portion of the document 106 using conventional program interface methods known to those skilled in the art.

Step 402 is followed by decision block 404, in which the publish engine 102 determines whether the pre-selected portion of the document contains multiple cells. The publish engine 102 uses conventional methods known in the art for determining whether the pre-selected portion contains multiple cells. Typically, multiple cells includes a data range of two or more cells not within a table such as a pivot table, two or more cells within a chart such as a pivot chart and including the entire chart or pivot chart, two or more cells within a table such as a pivot table and including the entire table or pivot table, a data range intersecting a part of a table, a non-contiguous range of cells including grouped sheets, a graphic or other object, and a data range containing a graphic or other object.

If the sender's pre-selected portion does not contain multiple cells, then the "NO" branch is followed to decision block 406. When the publish engine 102 determines that the sender's pre-selected portion does not contain multiple cells, then the publish engine 102 assumes that the pre-selected portion is a single data cell. The subroutine 316 continues to further determine the content of the user's pre-selected portion.

In decision block 406, the publish engine 102 determines whether the sender's pre-selected portion is a single cell within a table, such as a pivot table. The publish engine 102 uses conventional methods known in the art for determining whether the pre-selected portion is a single cell within a pivot table. The publish engine 102 can be programmed to determine whether a single cell is within other tables similar to pivot tables. If the pre-selected portion is not a single cell within a pivot table, then the "NO" branch is followed to decision block 408. Decision block 408 is further described below.

If the pre-selected portion is a single cell is within a table such as a pivot table, then the "YES" branch is followed to step 410. In step 410, the publish engine 102 changes the user interface 104 to display a selectable command such as "Send this pivot table". In this case, since the pre-selected portion is a single cell within a pivot table, the publish engine 102 assumes that the sender wants to select the entire pivot table. This and other assumptions make it easier for the sender to send related data such as one or more pivot tables. In response to determining that the user wants to select the entire pivot table, the publish engine 102 changes the user interface 104 to correspond with this assumption, and to present the option of sending the entire table to a recipient via e-mail. Typically, a send command on the user interface 104 provides the option to "Send" a document to a recipient. In some cases, the sender may be confused as to the meaning of the "Send" command. The publish engine 102 therefore changes the user interface 104 command from "Send" to "Send this pivot table". By changing the user interface 104 to correspond with the pre-selected portion of the document 106, the publish engine 102 creates a user interface 104 that can be better understood and interpreted by the sender to determine the full functionality of a "Send" command.

Step 410 is followed by step 412, in which the subroutine returns to step 308 in FIG. 3.

Returning to decision block 406, if the "NO" branch is followed to decision block 408, the publish engine 102 determines whether the pre-selected portion is a single cell within a chart, such as a pivot chart. The publish engine 102 uses conventional methods known in the art for determining whether the pre-selected portion is a single cell within a pivot chart. The publish engine 102 can be programmed to determine whether a single cell is contained within other similar types of charts. If the pre-selected portion is not a single cell within a pivot chart, then the "NO" branch is followed to step 418.

In step 418, the publish engine 102 changes the user interface 104 to display a command such as "Send this sheet". In this case, since the pre-selected portion is not a single cell within a chart, such as a pivot chart, the publish engine 102 assumes that the sender wants to select or highlight the entire document sheet, and the publish engine 102 changes the user interface 104 to correspond with this assumption. Typically, a "Send" command on the user interface 104 provides an option to send the pre-selected portion to a recipient. In response to determining the content of the pre-selected portion, the publish engine 102 changes the "Send" command option on the user interface 104 to "Send this sheet". By changing the user interface 104 to correspond with the pre-selected portion of the document 106, the sender can better understand and interpret the full functionality of a "Send" command.

Step 418 is followed by step 420, in which the subroutine returns to step 308 in FIG. 3.

Returning to decision block 408, if the publish engine 102 determines that the pre-selected portion is a single cell contained within a chart such as a pivot chart, then the "YES" branch is followed to step 414. In step 414, the publish engine 102 changes the user interface 104 to display a command such as "Send this chart". In this case, since the pre-selected portion is a single cell within a pivot chart, the publish engine 102 assumes that the sender wants to select or highlight the pivot chart, and the publish engine 102 changes the user interface 104 to correspond with this assumption. This and other assumptions make it easier for the sender to send related data such as one or more pivot charts. Typically, a "Send" command on the user interface 104 provides the sender with the option to send the pre-selected portion of the document 106 to a recipient. The publish engine 102 changes the standard "Send" command on user interface 104 to "Send this chart", thus providing the sender with a relatively easier user interface 104 command to interpret and understand the full functionality of the "Send" command.

Step 414 is followed by step 416, in which the subroutine returns to step 308 in FIG. 3.

Returning to decision block 404, if the pre-selected portion contains multiple cells, then the "YES" branch is followed to decision block 422. In decision block 422, the publish engine 102 determines whether the pre-selection portion is a table, such as a pivot table. The publish engine 102 uses conventional methods known in the art for determining whether the pre-selected portion is a pivot table. If the pre-selected portion is a pivot table, then the "YES" branch is followed to step 410.

As previously described in step 410, the publish engine 102 changes the user interface 104 to display a command such as "Send this table". Step 410 is followed by step 412, in which the subroutine returns to step 308 in FIG. 3.

Returning to decision block 422, if the publish engine 102 determines that the pre-selected portion is not a pivot table, then the "NO" branch is followed to decision block 424. In decision block 424, the publish engine 102 determines whether the pre-selected portion is a chart, such as a pivot chart. The publish engine 102 uses conventional methods known in the art for determining whether the pre-selected portion is a pivot chart. If the pre-selected portion is a pivot chart, then the "YES" branch is followed to step 414, in which the publish engine 102 changes the user interface 104 to display a command such as "Send this chart". In this case, since the pre-selected portion is multiple cells and not a pivot table, the publish engine 102 assumes that the sender wants to send the entire pivot chart, and the publish engine 102 changes the user interface 104 to correspond with this assumption. Typically, a "Send" command on the user interface 104 provides the option to send the pre-selected portion of the document 106 to a recipient. The publish engine 102 changes the user interface 104 command from "Send" to "Send this chart", thus providing a relatively easier user interface 104 to interpret and to understand the full functionality of a "Send" command.

Step 414 is followed by step 416, in which the subroutine returns to step 308 in FIG. 3.

Returning to decision block 424, if the publish engine 102 determines that the pre-selected portion of the document 106 is not a chart, such as a pivot chart, then the "NO" branch is followed to decision block 426. In decision block 426, the publish engine 102 determines whether the pre-selected portion is a data range. The publish engine 102 uses conventional methods known in the art for determining whether the user's pre-selected portion is a data range. A data range includes multiple cells contained within a table such as a pivot table, multiple cells intersecting a part of a table, and a data range containing a graphic or other similar type of object. If the pre-selected portion is a data range, then the "YES" branch is followed to step 428.

In step 428, the publish engine 102 changes the user interface 104 to display a command such as "Send this selection". In this case, since the pre-selected portion is multiple cells and not an entire pivot table or pivot chart, the publish engine 102 assumes that the sender wants to select or highlight a data range. This and other assumptions make it easier for the sender to send related data such as one or more cells. The publish engine 102 changes the user interface 104 to correspond with this assumption. Typically, a "Send" command on the user interface 104 provides the option to send a pre-selected portion of a document 106 to a recipient. The publish engine 102 changes the "Send" command on the user interface 104 command to "Send this selection", thus providing a relatively easier user interface 104 to interpret and to understand the full functionality of a "Send" command.

Step 428 is followed by step 430, in which the subroutine returns to step 308 in FIG. 3.

Figure 5:
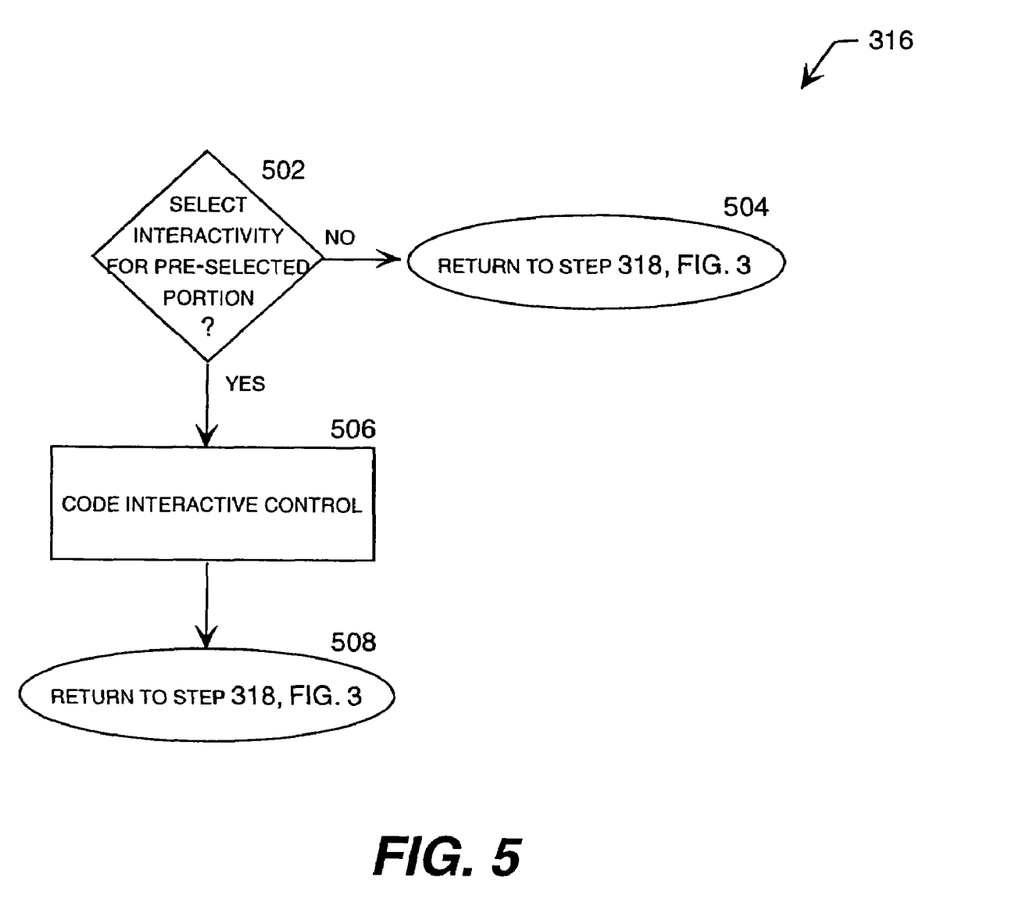
FIG. 5 is a logic flow diagram illustrating an exemplary method for inserting user selected interactive controls for the user pre-selected portion of the document into the e-mail message.

FIG. 5 is a logic flow diagram illustrating an exemplary method for determining interactive controls for a pre-selected portion of a document 106 being sent to a recipient. The subroutine 316 begins at decision block 502. In decision block 502, the publish engine 102 determines whether the sender wanted to make the pre-selected portion "interactive". Typically, the user interface 104 provides the sender with a command option such as "Add Interactivity". The sender can select the command option by generating a user input 108 with an input device such as a keyboard 40 or a mouse 42. The publish engine 102 detects or receives the user input 108 for the command option through the application program 36. If no user input 108 for the command option such as "Add Interactivity" is detected or received by the publish engine 102, then the "NO" branch is followed to step 504.

In step 504, the subroutine returns to step 318 in FIG. 3.

If user input 108 for the command option such as "Add Interactivity" is detected by the publish engine 102, then the "YES" branch is followed to step 506. In step 506, the publish engine 102 codes one or more interactive controls corresponding with the user's pre-selected portion.

The publish engine 102 can code interactive controls corresponding with the pre-selected portion of the document 106. Interactive controls provide a mail client 110 or other suitable application program with functionality to manipulate and view a received e-mail with the pre-selected portion of the document 106. For example, interactive controls can provide a recipient with functions including pivoting, filtering, sorting, charting, calculations, and other similar types of spreadsheet or other application program functionality. The interactive controls permit a recipient to perform useful functions with the pre-selected data such as filtering, sorting, and calculating, without having to launch and execute a separate application program 36, such as Microsoft EXCEL 2000 or another compatible application program to read or view the pre-selected portion.

Interactive controls can be written in a web browser compatible language executable by a mail client 110 or a web browser. One language model to write interactive controls is ActiveX. The use of ActiveX is well understood in the computer arts, and those of ordinary skill will readily appreciate how the ActiveX control may be used in accord with the present invention to provide "interactive" data tables in HTML documents.

ActiveX is a language model for writing programs so that other application programs can call them. ActiveX is used with a Web browser such as Microsoft Internet Explorer to make interactive web pages that look and behave like computer programs, rather than static pages. With ActiveX, users can ask or answer questions, use push buttons, and interact in other ways with the pre-selected portion of the document 106 contained within the e-mail message or in a web page.

Typically, an ActiveX control can be automatically downloaded and executed by an electronic mail client 110 or a web browser. ActiveX is not a programming language, but rather a set of rules for how applications should share information. A user can develop ActiveX controls in a variety of languages, including C, C++, Visual Basic, and Java. ActiveX controls have full access to the Windows operating system, however, ActiveX controls are currently limited to Windows environments. Related to ActiveX is a scripting language called VBScript that enables Web authors to embed interactive elements in HTML documents. Currently, Microsoft Internet Explorer supports Java, JavaScript, and ActiveX, whereas Netscape's Navigator browsers support only Java and JavaScript, though plug-ins can enable support of VBScript and ActiveX.

ActiveX is one type of interactive control that can be coded within an HTML document or file to include information to enable the viewer of the HTML document displayed in a web browser to actually manipulate the data, not just view the data. Preferably, the ActiveX control is only written into the HTML document being sent to a mail client or recipient user if a user has actively selected an "interactive" command on the user interface 104 or within the application program 36. The term "interactive" is used to denote spreadsheet functionality of a data table in an HTML document being viewed by a Web browser obtained by using an ActiveX control. The term "static" HTML refers to HTML with no ActiveX control component. In the preferred embodiment, static HTML is the default selection unless the default is overridden by a user, or otherwise selected by the user. Such a selection is made by the user in decision block 502 of subroutine 316, which was discussed above.

Depending upon the type of mail client 110, interactive controls may not be functional. For example, interactive controls will function for HTML compatible mail clients that support ActiveX, however, interactive controls will not function for HTML mail clients that only support tables. Further information regarding the ActiveX control may be found in David Chappell: Understanding ActiveX and OLE, Redmond, Wash.: Microsoft Press, 1996. ISBN 1-572-31216-5.

Step 506 is followed by step 508, in which the subroutine 316 returns to step 318 in FIG. 3.

In view of the foregoing, it will be appreciated that the invention provides an improved method and system for sending a pre-selected portion of an electronic spreadsheet document to a mail client via electronic mail. Furthermore, the invention provides a method and system for sending a pre-selected portion of an electronic spreadsheet document to a mail client via electronic mail that can be viewed and manipulated within its original spreadsheet document formatting without having to open another application program.

It should be understood that the foregoing relates only to the exemplary embodiments of the present invention, and that numerous changes may be made therein without departing from the spirit and scope of the invention as defined by the following claims.

The invention claimed is:

1. A computer-readable medium having computer-executable instructions for performing a method for automatically sending a pre-selected portion of a document to a recipient, the method comprising:

receiving a pre-selected portion of a document from a first application;

determining content in the pre-selected portion of the document; and in response to determining the content, changing a user interface to correspond with the content wherein the user interface comprises a dynamic send command that corresponds to content of the pre-selected portion of the document and changes in response to the content of the pre-selected portion;

receiving a command to send the pre-selected portion of the document to a recipient via electronic mail;

in response to receiving the command to send the pre-selected portion of the document, coding the pre-selected portion of the document for transmission via electronic mail;

launching an electronic mail application program, and inserting the coded pre-selected portion of the document into an e-mail message;

detecting a command to apply an interactive control to the pre-selected portion of the document;

in response to receiving a command to apply an interactive control to the pre-selected portion, coding an interactive control for the pre-selected portion, and inserting the coded interactive control into the e-mail message with the coded pre-selected portion of the document so that the recipient can apply the interactive control to the pre-selected portion without opening the first application; and sending the coded pre-selected portion of the document and the interactive control to the recipient via electronic mail.

2. A computer-readable medium as defined in claim 1, wherein coding the pre-selected portion of the document comprises coding the pre-selected portion into HTML.

3. A computer-readable medium as defined in claim 1, wherein the pre-selected portion of the document comprises a graphic or other object.

4. A computer-readable medium as defined in claim 1, wherein the document comprises a spreadsheet document.

5. A computer-readable medium as defined in claim 4, wherein the interactive control comprises a spreadsheet application program function.

6. A computer-readable medium as defined in claim 5, wherein the interactive control provides functionality including at least one of filtering, sorting, calculating, pivoting, and charting.

7. A computer-readable medium as defined in claim 1, wherein the document comprises a word processing document.

8. A computer-readable medium as defined in claim 1, wherein the interactive control comprises information to enable the recipient viewing the content of the pre-selected portion of the document to manipulate the content.

9. A computer-readable medium as defined in claim 8, wherein the interactive control comprises an ActiveX control.

10. A computer-readable medium having computer-executable instructions for performing a method for automatically sending a pre-selected portion of a spreadsheet document to a recipient, the method comprising:

receiving a pre-selected portion of the spreadsheet document from a spreadsheet application;

determining content in the pre-selected portion of the spreadsheet document; and in response to determining the content, changing a user interface to correspond with the content wherein the user interface comprises a dynamic send command that corresponds to content of the pre-selected portion of the spreadsheet document and changes in response to the content of the pre-selected portion;

receiving a command through a user interface to send the pre-selected portion of the spreadsheet document to a recipient via electronic mail;

in response to receiving the command to send the pre-selected portion of the spreadsheet document, coding the pre-selected portion of the spreadsheet document for transmission via electronic mail, launching an electronic mail application program, and inserting the coded pre-selected portion of the spreadsheet document into an e-mail message;

detecting a command to apply an interactive control to the pre-selected portion of the spreadsheet document;

in response to receiving a command to apply an interactive control to the pre-selected portion, coding an interactive control for the pre-selected portion, and inserting the coded interactive control into the e-mail message with the coded pre-selected portion of the spreadsheet document so that the recipient can apply the interactive control to the pre-selected portion without opening the spreadsheet application; and sending the coded pre-selected portion of the spreadsheet document and the interactive control to the recipient via electronic mail.

11. A computer-readable medium as defined in claim 10, wherein the pre-selected portion of the spreadsheet document is coded into HTML.

12. A computer-readable medium as defined in claim 10, wherein the pre-selected portion of the spreadsheet document comprises a data range comprising a single cell or multiple cells.

13. A computer-readable medium as defined in claim 10, wherein the pre-selected portion of the spreadsheet document comprises a table or pivot table.

14. A computer-readable medium as defined in claim 10, wherein the pre-selected portion of the spreadsheet document comprises a chart or pivot chart.

15. A computer-readable medium as defined in claim 10, wherein the interactive control provides functionality including at least one of filtering, sorting, calculating, pivoting, and charting.

16. A computer-readable medium as defined in claim 15, wherein the interactive control comprises an ActiveX control.

* * * * *

UNITED STATES PATENT AND TRADEMARK OFFICE
CERTIFICATE OF CORRECTION

PATENT NO. : 7,454,471 B2
APPLICATION NO. : 11/181683
DATED : November 18, 2008
INVENTOR(S) : Sorge et al.

It is certified that error appears in the above-identified patent and that said Letters Patent is hereby corrected as shown below:

In Title page, in Item (54), under "Title" column 1, line 1, delete "SENDING A RANGE" and insert -- SENDING CODED INTERACTIVE CONTROLS WITH A PORTION OF A DOCUMENT --, therefor.

In column 1, line 1, delete "SENDING A RANGE" and insert -- SENDING CODED INTERACTIVE CONTROLS WITH A PORTION OF A DOCUMENT --, therefor.

In column 1, line 2, above "TECHNICAL FIELD" insert -- RELATED APPLICATIONS
This application claims the benefit of priority and is a continuation of United States Application Serial No. 09/595,741, filed June 16, 2000, entitled SENDING A RANGE, which is incorporated herein by reference. --.

Signed and Sealed this
Third Day of May, 2011

David J. Kappos
*Director of the United States Patent and Trademark Office*